Patented June 29, 1954

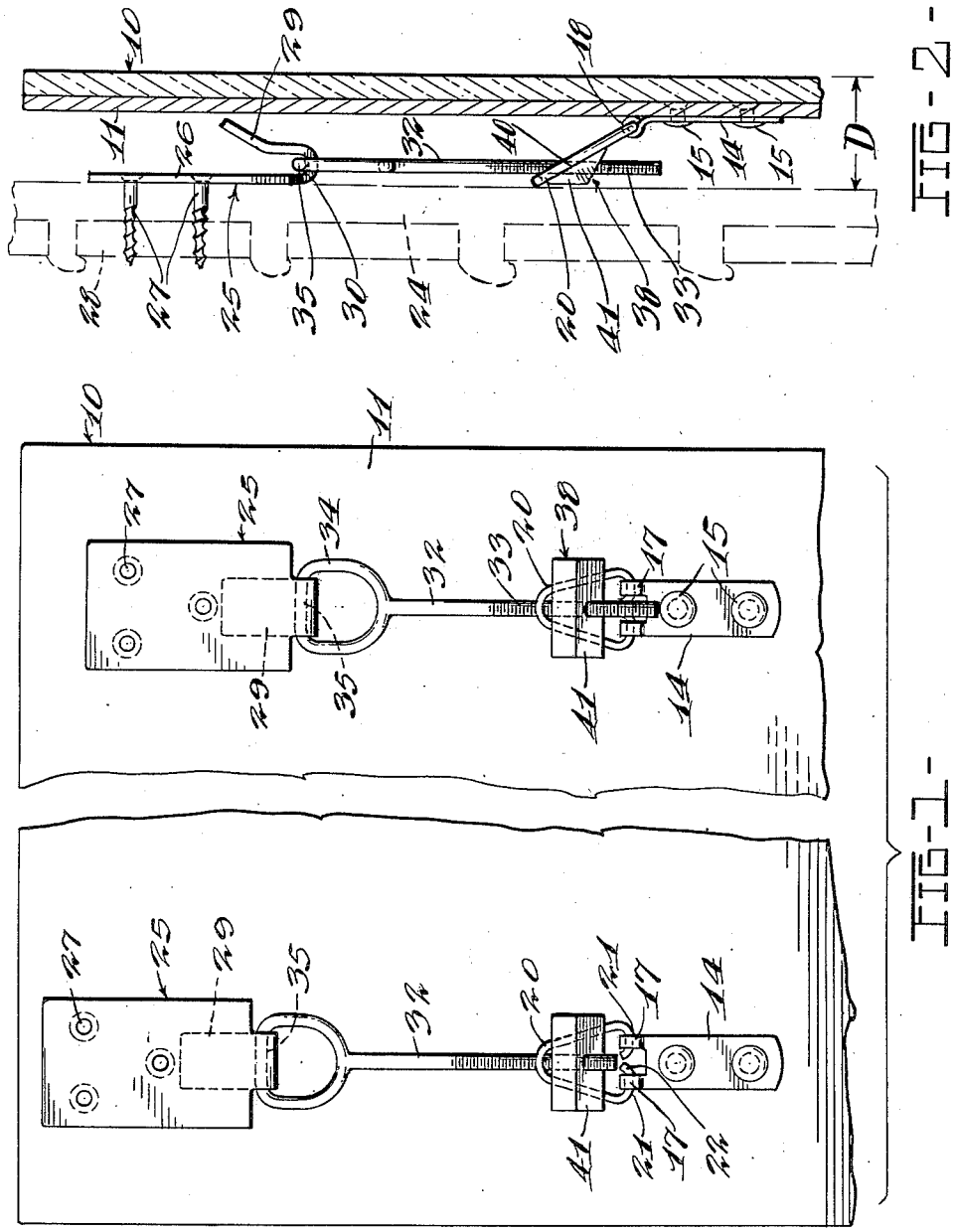

2,682,383

UNITED STATES PATENT OFFICE 2,682,383

SUPPORTING DEVICE FOR MIRRORS AND THE LIKE

Tolly Horwitz, Toledo, Ohio

Application December 31, 1949, Serial No. 136,238

2 Claims. (Cl. 248—31)

This invention relates to supporting devices and more especially to means for supporting or suspending mirrors, pictures and the like from a wall or supporting structure.

Heretofore it has been conventional practice for decorators to support or suspend mirrors, pictures and the like from walls through the use of flexible stranded wire attached to clips carried upon the rear of the mirrors or pictures and to engage the wire over hooks or other means fastened or secured to the wall. Such an arrangement has not been satisfactory in that it is difficult to determine the required length of wire for properly supporting the mirror or picture and is exceedingly difficult to hang the mirror or picture and adjust the same to a horizontal position. Moreover vibration of the wall often times dislodges the supporting means or causes the mirror or picture to shift position. Furthermore with the widespread use of large picture mirrors which are of considerable weight, a wire functioning as a support has been found in many instances insufficient to carry the mirror.

The present invention embraces a suspension means for supporting a mirror, picture or the like from a wall or other suitable support by an arrangement which is readily adjustable to obtain the proper height and vertical plumbness of the mirror.

An object of the invention resides in the provision of means engageable with loops or clips disposed at the rear of a mirror or picture and adapted for engagement with projections on brackets carried by the wall or other support in a manner whereby the liability for the mirror or picture to shift position is eliminated.

Another object of the invention resides in the use of a threaded means for supporting a mirror, picture or the like which is capable of being rotatably adjusted so as to properly position a mirror or picture on the wall or support and to level the same, this operation being accomplished without the use of tools.

Still another object of the invention is the provision of threaded means and an associated member capable of being adjusted and disposed whereby the mirror or picture may be plumbed or leveled without removing the mirror or picture from the wall.

Further object of the invention is the provision of a threaded member cooperating with an adjustable abutment or nut in a manner whereby the mirror, picture or the like suspended from a wall is disposed at a minimum distance therefrom.

A further object of the invention is the provision of a simple yet effective means which may be inexpensively manufactured for supporting comparatively heavy mirrors or pictures from a wall or other support whereby the picture may be removed or replaced without the use of tools and the picture adjusted to a proper or horizontal position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

In the drawings:

Figure 1 is a rear view of the supporting device of my invention illustrating the arrangement associated with the clips secured to the rear of a mirror, picture or the like;

Figure 2 is a side elevational view of the mirror or picture supporting means illustrated in Figure 1, and Figure 3 is an isometric view illustrating an element of the supporting device of my invention.

While I have illustrated a form of my invention as utilized for supporting a mirror from a substantially vertical wall it is to be understood that I contemplate the utilization of the supporting device of my invention with pictures, wall ornaments, or other members adapted to be supported by a vertical wall or other structure.

Referring to the drawings in detail there is illustrated in Figures 1 and 2 a mirror 10 which is provided with a backing sheet 11 which may be formed of fiber board, cardboard, laminated wood or the like secured to the mirror 10 by suitable clips or by cementing or otherwise joining the mirror to the sheet 11. The backing sheet or member 11 is provided with clips 14 which are secured to the sheet by means of rivets 15 or other suitable securing means. Each clip 14 is bifurcated at one end and the furcations 17 are bent to an eye or loop formation as shown at 18 in Figure 2. A bail or loop 20 is formed with leg portions 21, the latter extending into the juxtaposed eyes 18 formed at the end of a clip 14. The adjacent extremities of the legs 21 of each bail are bent upwardly as illustrated at 22 in Figure 1 to retain the legs 21 in pivotal or articulated assembly with the eyes 18 so as to permit swivel movement of the bail 20 with respect to its supporting clip 14.

The supporting device of my invention is adapted for cooperation with means arranged to be secured permanently to a wall 24 or other member upon which the mirror 10 is to be mounted. In the embodiment illustrated, there is provided a bracket 25 for each of the supporting devices, each bracket 25 being formed with a uniplanar portion 26 adapted to be disposed in contiguous relation with the wall and formed with openings to accommodate wood screws 27 or other securing means adapted to be threaded into the lath 28 forming part of the wall structure. In installations where the supporting wall is constructed of concrete or brick, one or more openings may be drilled into the wall and expansion bolts of conventional construction used in lieu of the wood screws 27. Toggle bolts may also be used with wall structures formed of rock lath or the like. Each bracket 25 is provided with a projection or tongue 29 which is formed or bent upwardly as shown in Figure 2 to form a bight configuration or hook 30.

Each supporting device of my invention is inclusive of a member or bar 32 preferably of circular cross-section which is threaded as at 33 throughout a portion of its length, the other end of the bar being formed with a closed loop or eye configuration 34 having a horizontal portion 35 adapted to engage in the bight configuration or hook 30 formed by the projection 29 on the bracket 25. In this manner the portion 35 of the bar 32 is arranged for pivotal movement in the bight portion, seat or socket 30 formed by the projection 29.

Means are provided for establishing an operative adjustable connection between the bar 32 and the bail 20 connected to a clip 14. This means comprises an elongated bar or block 38 which is generally triangular in cross-section as illustrated in Figures 2 and 3. As particularly shown in Figure 2, the bar 38 is formed with a substantially flat surface 40 which is adapted to be disposed coextensively with the bail 20 when the mirror 10 is in supported position and forms an abutment means to establish a connection between the bail 20 and the bar 32. The bar or block 38 is formed with a flat or uniplanar surface 41 which, as illustrated in Figure 2, is in substantial parallelism with the surface of the wall 24 or other support when the mirror is in suspended or supported position. The block 38 is formed with a central opening 44 which is threaded and adapted to be received upon the threaded portion 33 of the bar 32.

The installation and use of the arrangement of my invention is as follows: A pair of brackets 25 are first installed upon the supporting wall 24 or other structure adapted to carry the mirror 10, picture or other element. The brackets 25 are preferably arranged in a horizontal plane or level position or as near such position as is practically possible to obtain. The bars 32 are then threaded into the openings in the blocks 38 thus establishing an interconnection between the bails 20 and the bars 32. The bars 32 are threaded into the blocks 38 a sufficient distance as may be necessary or desirable to suspend the mirror from the brackets. It should be noted, however, that the righthand bracket 25 in Figure 1 is shown in a lower relative position upon a wall than the lefthand bracket 25. This is for the purpose of illustrating that suitable adjustments may be made through the relative positions of the bars 32 with respect to the blocks 38 in order to obtain a level or lateral correct position of the mirror 10 even though the brackets are not accurately positioned in a horizontal plane. After the bars 32 are assembled with the blocks 38 so as to embrace the bails 20 in the manner illustrated in Figure 2, the person making the installation of the mirror then hooks or engages the loop or bail 34 formed on each of the bars 32 over a projection 29 on the brackets 25. If it is found upon trial installation in this manner that one side of the mirror is too low, it is only necessary to disconnect or disengage the loop 34 of one of the bars 32 from its adjacent projection 29 and rotate the bar 32 relative to the block or nut 38 so as to shorten or lengthen the effective distance between the loop end of the bar and the bail 20 as required. The loop 34 of the bar may then be reengaged with the projection 29 of a bracket and if the mirror is in a horizontal position after such adjustment, the installation may remain as a permanent one. If further adjustment is required the above mentioned adjustment may be repeated until the correct or desired position for supporting the mirror or other object is attained.

It should be noted that when the mirror 10 is in supported or suspended position, the mirror is at a minimum distance designated "D" in Figure 2 from the wall or support 24. This is accomplished through the triangular cross-sectional configuration of the block 38 and its particular engaging relation with the bail 40 in the manner illustrated in Figure 2. This is essential in the installation of large mirrors as it is highly desirable that the mirror be suspended from the support with the least minimum horizontal distance therefrom. Thus the surfaces 40 being at acute angles with respect to the surfaces 41 permit the bails 20 to extend upwardly at acute angles relative to the plane of the mirror to bring the mirror backing sheet 11 comparatively close to the bars 32. In mirror supporting position, the surfaces 41 of the abutment bars or nuts 38 lie in close parallel relationship to the outer surface of the wall 24. In this manner the distance "D" from the mirror surface to the wall surface is reduced to a minimum dimension.

It is to be understood that the clip 14 may if desired be formed with an integral angularly projecting bail portion in lieu of the pivotally supported bail 20 without departing from the spirit of the invention.

It is apparent that, within the scope of the invention, modifications and different arrangements may be made other than is herein disclosed, and the present disclosure is illustrative merely, the invention comprehending all variations thereof.

What I claim is:

1. A device for supporting a mirror or the like including a bracket adapted to be secured to a wall; a member having a loop portion engaging with the bracket; a clip adapted to be secured to the mirror; said clip having spaced eyes formed thereon; a U-shaped bail having end portions extending into the eyes formed on said clip; said member having a threaded portion extending through the bail; a wedge-shaped block having a threaded opening receiving the threaded portion of said member; said block having an exterior surface arranged at an acute angle with respect to the axis of said member and in parallel engagement with the bail whereby the mirror is supported from said member through engagement of the wedge-shaped block with the bail.

2. A device for suspending a mirror construction from a support including a bracket having a hook portion formed thereon and adapted to be secured to the support; a clip adapted to be secured to the mirror construction; said clip having a pair of spaced eyes; a bail of generally U-shaped configuration, the terminal portions of the bail being bent transversely and projecting into the eyes of the clip whereby the bail is pivotally connected to the clip; a bar having a loop formed at one end engaging with the hook portion on the bracket; said bar having a threaded portion projecting through the bail; an abutment block having a threaded opening threaded upon the bar; said abutment block being of triangular cross-section and having an angular surface in parallel engagement with the bail and another surface arranged in substantial parallelism with the axis of the threaded opening and adapted for engagement with the support.

References Cited in the file of this patent

UNITED STATES PATENTS

| Number | Name | Date |
|---|---|---|
| 368,251 | Stuebner | Aug. 16, 1887 |
| 681,380 | Turner | Aug. 27, 1901 |
| 916,285 | Elwood et al. | Mar. 23, 1909 |
| 1,196,936 | Elsass | Sept. 5, 1916 |
| 1,878,645 | Robinson | Sept. 20, 1932 |
| 2,438,436 | Graves | Mar. 23, 1948 |
| 2,522,901 | Schnager et al. | Sept. 19, 1950 |
| 2,546,359 | Emrick | Mar. 27, 1951 |